United States Patent [19]

Hikmet et al.

[11] Patent Number: 5,155,610
[45] Date of Patent: Oct. 13, 1992

[54] METHOD OF PROVIDING A LIQUID CRYSTALLINE AUXILIARY LAYER IN A DISPLAY CELL

[75] Inventors: Rifat A. M. Hikmet, Eindhoven, Netherlands; Dirk J. Broer, Wilmington, Del.

[73] Assignee: U.S. Philips Corporation, New York, N.Y.

[21] Appl. No.: 717,959

[22] Filed: Jun. 20, 1991

[30] Foreign Application Priority Data

Jul. 19, 1990 [NL] Netherlands ............... 9001643

[51] Int. Cl.$^5$ ............................................. G02F 1/13
[52] U.S. Cl. ........................................ 359/75; 359/77
[58] Field of Search ............. 359/75, 76, 77, 78; 252/299.6; 428/1

[56] References Cited

U.S. PATENT DOCUMENTS

| | | | |
|---|---|---|---|
| 5,011,267 | 4/1991 | Miller et al. | 359/75 |
| 5,069,813 | 12/1991 | Patel | 359/75 |

FOREIGN PATENT DOCUMENTS

| | | | |
|---|---|---|---|
| 0386782 | 9/1990 | European Pat. Off. | 359/75 |
| 62-245218 | 10/1987 | Japan . | |
| 1-251015 | 10/1989 | Japan | 359/75 |
| 1-252934 | 10/1989 | Japan | 359/75 |
| 1-304424 | 12/1989 | Japan | 359/75 |
| 2230105 | 10/1990 | United Kingdom | 359/75 |

*Primary Examiner*—Stanley D. Miller
*Assistant Examiner*—Huy K. Mai
*Attorney, Agent, or Firm*—John C. Fox

[57] ABSTRACT

The invention relates to a method of providing a surface layer on a substrate, which surface layer can bring about an inclined orientation of the molecules of the liquid crystalline layer applied to the surface layer at the interface between the surface layer and the liquid crystalline layer. The surface layer is manufactured from a liquid crystalline auxiliary layer in which the orientation of at least a part of the molecules is permanently fixed.

13 Claims, 5 Drawing Sheets $C_5H_{11}$—◯—◯—◯—C≡N     8%

| Structure | Percentage |
|---|---|
| C₃H₇–(H)–⟨F⟩–⟨⟩–(H)–C₃H₇ (with F on middle ring) | 5% |
| C₅H₁₁–(H)–⟨F⟩–⟨⟩–(H)–C₃H₇ | 5% |
| C₅H₁₁–(H)–⟨F⟩–⟨⟩–(H)–C₅H₁₁ | 5% |
| C₅H₁₁–(H)–⟨⟩–⟨⟩–(H)–C₃H₇ | 5% |
| C₃H₇–(H)–⟨⟩–⟨⟩–(H)–C₃H₇ | 5% |
| C₃H₇–(H)–⟨⟩–OCH₃ | 10% |
| C₂H₅–O–(H)–(H)–C₃H₇ | 10% |
| CH₃–O–(H)–(H)–C₃H₇ | 33% |
| C₅H₁₁–(H)–(H)(C≡N)–C₅H₁₁ | 10% |
| C₄H₉–(H)–(H)(C≡N)–C₇H₁₅ | 12% |

METHOD OF PROVIDING A LIQUID CRYSTALLINE AUXILIARY LAYER IN A DISPLAY CELL

BACKGROUND OF THE INVENTION

The invention relates to a method of providing a surface layer on a substrate, which surface layer brings about an inclined orientation of the molecules of a liquid crystalline layer in contact with the surface layer, at the interface between the surface layer and the liquid crystalline layer, and also relates to a liquid crystalline display cell which comprises at least one such substrate.

In the field of liquid crystalline display cells, there is a demand for substrates having a surface layer which induces molecules of a liquid crystalline layer in contact therewith to a strongly inclined orientation having an angle of inclination exceeding, for example, 3°. For example, in the SBE-display cell, SBE standing for "Supertwisted Birefringen Effect", which cell comprises chiral nematic layers having angles of rotation which are larger than 90°, surface-induced angles of inclination larger than 5° are required to preclude the occurrence of stripe instabilities in the liquid crystalline material applied.

To obtain such large angles of inclination, silicon oxide can be obliquely evaporated in a vacuum, onto the substrates. However, it is difficult and costly to apply this process for mass production. By way of alternative, synthetic resins, such as polyparaphenylene and some polyimides, which are subjected to complicated treatments, can be used. However, they have a poor reproducibility, and the mechanism bringing about the inclined orientation is not understood at all.

OBJECTS AND SUMMARY OF THE INVENTION

It is an object of the present invention to provide a substrate comprising a surface layer which can bring about a desired angle of inclination, within a wide range of angles, of the molecules in liquid crystalline layer, which surface layer is also suitable for massproduction, is reproducible, and allows the desired angle of inclination to be adjusted in a simple and easy manner.

For this purpose, the invention provides a method of the type mentioned in the opening paragraph, characterized in that, as the surface layer, a liquid crystalline auxiliary layer is applied to the substrate, the angle of inclination of the molecules of said auxiliary layer at the interface with the substrate differing maximally from the angle of inclination of its molecules at the interface with a predetermined medium (such as a liquid crystalline material for display) when the liquid crystalline auxiliary layer is sufficiently thick, and the orientation of at least a part of its molecules can be permanently fixed, said liquid crystalline auxiliary layer being applied in such a thickness that, at the interface with the predetermined medium, the molecules of the liquid crystalline auxiliary layer have a desired angle of inclination which lies between the maximum and minimum angles of inclination, after which the orientation of at least a part of the molecules with the desired angle of inclination of the liquid crystalline auxiliary layer is permanently fixed.

It is known to apply an orientation layer to a substrate for a liquid crystalline display cell, which orientation layer provides molecules of a liquid crystalline layer present on the orientation layer with a slightly inclined orientation, for example, an angle of inclination of between 0.1 and 3 degrees. A rubbed polymer film can, for example, be used as the orientation layer.

By applying such an orientation layer to the substrate before the liquid crystalline auxiliary layer is provided, a direction of inclination can be positively imposed on the molecules of the liquid crystalline auxiliary layer at the interface with the orientation layer. In other words, the orientation layer dictates the direction of inclination, while the liquid crystalline auxiliary layer, as it were, entrances the angle of inclination, as will be explained in the description of the drawing.

When, for example, said orientation layer is used, the molecular orientation of the liquid crystalline auxiliary layer at the interface with the substrate may be substantially homogeneous or, for example, slightly inclined and at least substantially homeotropic at the interface with the predetermined medium.

When the permanent fixation is carried out in a nitrogen atmosphere, the molecular orientation of the liquid crystalline auxiliary layer at the interface with the predetermined medium, in this case nitrogen gas, is homeotropic.

A mixture of liquid crystalline materials can be used as the liquid crystalline auxiliary layer, which mixture yields an anisotropic gel after fixation by photopolymerisation. For the manufacture of an anisotropic gel from suitable mixtures of liquid crystalline materials, reference is made to the nonprepublished Netherlands Patent Application NL 90 00 808. Said mixture may more particularly consist of, on the one hand, a low-molecular liquid crystalline submixture such as E7 from BDH and, on the other hand, an acrylate, epoxy compound, vinyl ether compound or thiolene system, such as C6M which has been synthesized by Philips, dissolved in THF (tetrahydrofuran). The chemical formulae of E7 and C6M are shown on the formula sheet.

Finally, the present invention relates to a liquid crystalline display cell which may be conventionally constructed but which comprises at least one substrate having a surface layer manufactured according to the proposed method.

BRIEF DESCRIPTION OF THE DRAWING

The invention will be explained in greater detail in connection with the accompanying drawing, in which

FIGS. 6(a)-(d) show the formulae for and relative amounts of the components of E7; and FIGS. 7(a)-(j) show the formulae for and relative amounts of the components of ZLi.

DESCRIPTION OF THE PREFERRED EMBODIMENTS

Figure 1:
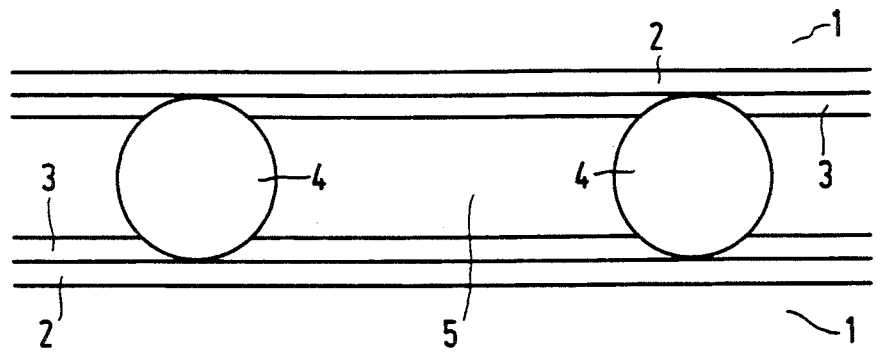
FIG. 1 is a diagrammatic sectional view, not to scale, of a part of a display cell according to the present invention.

With reference to the formulae, the following mixture of liquid crystalline materials was provided as the liquid crystalline auxiliary layer on a substrate in the form of a glass plate to which a 40 nm thick rubbed polymide layer was applied as the orientation layer: 89.1% by weight of E7, 9.9% by weight of C6M 1% by weight of a photoinitiator, dissolved in THF, and spaces having a thickness of 6.5 μm. A quantity of the mixture in solution was spin coated onto the polyimide layer on the glass plate. The resulting composite was introduced into a chamber having a nitrogen atmosphere, in which, after a certain waiting time, polymerisation by ultraviolet radiation was initiated at room temperature to convert the liquid crystalline layer to an anisotropic gel layer. The waiting time should be sufficient to allow the formation of a second such substrate was placed on top of the first, the substrates spaced apart by said spacers and oriented so that the opposed orientation layers are rubbed in opposite directions. The cell thus formed was filled with liquid crystalline material, for example E70 from BDH, and subsequently sealed. A part of said cell is shown in FIG. 1. Reference numeral 1 denotes the glass substrates, reference numeral 2 denotes the rubbed polyimide layers, reference numeral 3 denotes the anisotropic gel, reference numeral 4 denotes the spacers and reference numeral 5 denotes the liquid crystalline material to be used for display.

Figure 2A:
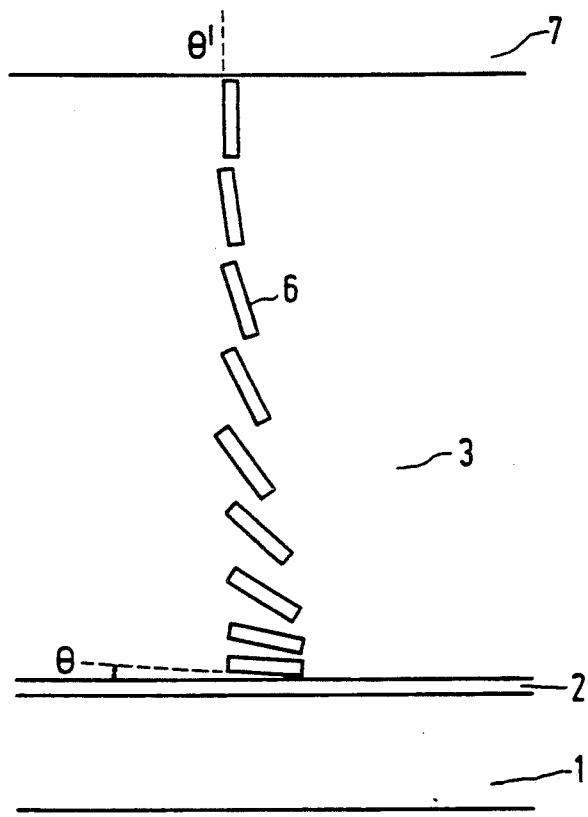
FIGS. 2A and 2B are also diagrammatic sectional views, not to scale, of one of the substrates of the cell shown in FIG. 1, said substrate having a sufficiently thick and a relatively thin liquid crystalline auxiliary layer, respectively, in particular an anisotropic gel layer.
Figure 2B:
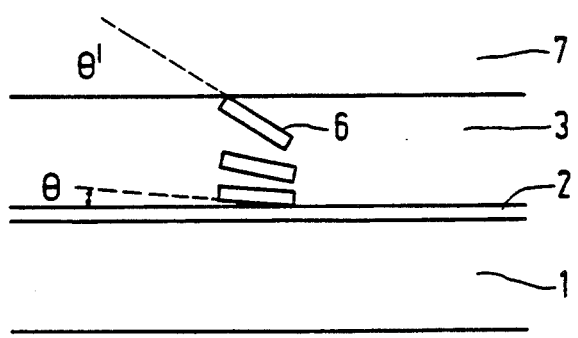

With reference to FIGS. 2A and 2B, the theory on which the present invention is based will be explained. It is well-known that in the case of an air interface, surface-active molecules direct their relevant groups to said air interface in order to reduce the surface energy of the system. In the case of the mixture of liquid crystalline materials comprising molecules which are composed of cyano-bi/terphenyl groups bonded to an aliphatic chain, at an air interface, the molecules will direct their aliphatic groups to the surface so as to minimize the surface energy of the system. When using a sufficiently thick liquid crystalline auxiliary layer or an orientation layer, such as a rubbed polymer layer, for example a polyimide layer in which the liquid crystalline molecules tend to orient their optical centre line parallel to the surface, the orientation of the liquid crystalline molecules will continuously vary from the interface between the orientation layer and the liquid crystalline auxiliary layer and the interface between the liquid crystalline auxiliary layer and air. This is shown in FIG. 2A. The parts of FIGS. 2A and 2B which correspond to those of FIG. 1 bear the same reference numerals as in FIG. 1. The liquid crystalline molecules bear reference numeral 6, while the air layer bears reference numeral 7. Besides, the direction of rubbing in both FIG. 2A and FIG. 2B is from right to left. The angle of inclination formed by the rubbed orientation layer is indicated by $\theta$, and the angle of inclination at the interface between the liquid crystalline auxiliary layer and the air layer is indicated by $\theta'$.

With reference to FIG. 2B, an inclined orientation with an angle of inclination $\theta'$ of the molecules at the air interface is obtained when a much thinner liquid crystalline auxiliary layer is selected. By rubbing the orientation layer and by virtue of the induced small angle of inclination $\theta$ of a few degrees, the molecules are oriented, such that the inclination across the liquid crystalline auxiliary layer is enhanced in the angle of inclination $\theta'$. Thus, various angles of inclination can be formed at the air interface by varying the thickness of the liquid crystalline auxiliary layer. By converting the mixture of liquid crystalline materials of the liquid crystalline auxiliary layer into an anisotropic gel, the desired inclination angle $\theta'$ at the air interface is fixed.

Figure 3:
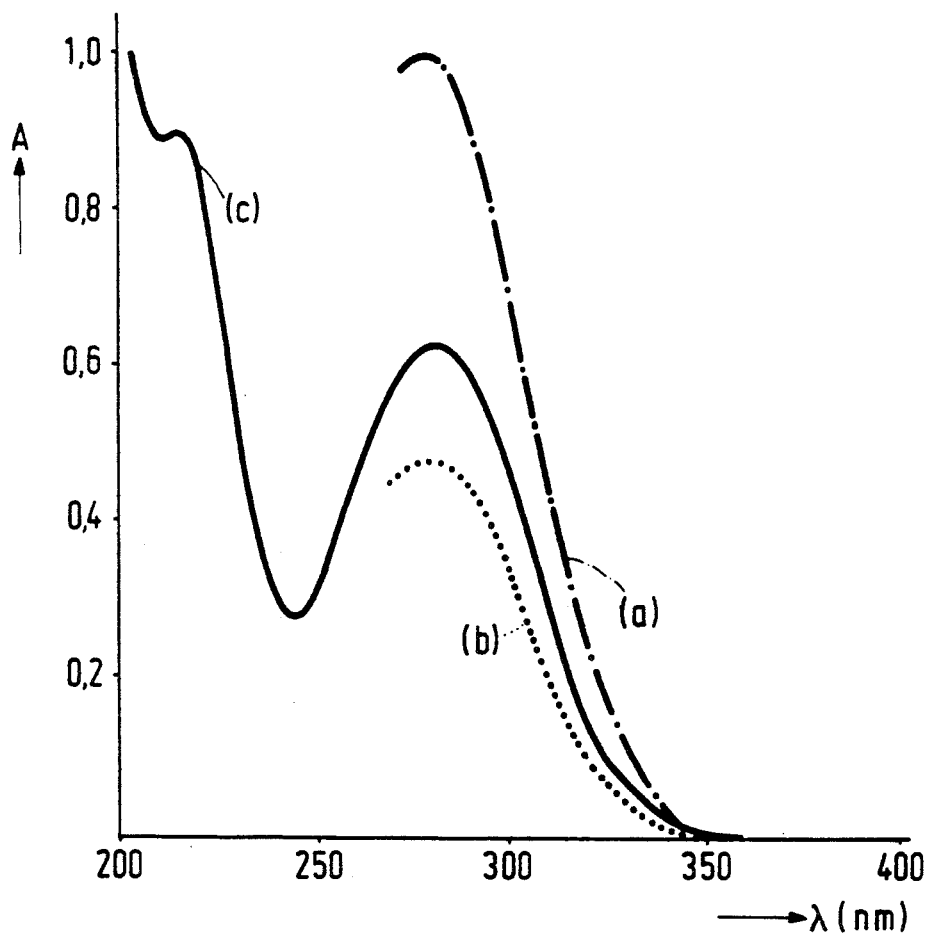
FIG. 3 shows three UV-spectra of an anisotropic gel layer which has been spin coated from a solution onto a rubbed polyimide layer, the direction of polarisation and two of the spectra being obtained through a polarizer where the directions rubbing are mutually parallel (a) and perpendicular (b), and the third spectrum (c) being obtained where no polarizer is used.

UV spectroscopy was used to verify whether molecules in anisotropic gels formed on rubbed polyimide surfaces have an inclined orientation. FIG. 3 shows UV subspectra (a) and (b) of the anisotropic gel in two main directions of polarisation as well as a UV spectrum (c) without the use of a polarizser. The absorption A (in arbitrary units) was measured as a function of wavelength $\lambda$ before (a) and after (b) the anisotropic gel layer had been rotated about an axis extending perpendicularly to the direction of rubbing, to examine the molecular orientation. The spectra indicate that the molecules are dichroic and that absorption is higher in the direction of molecular orientation.

Figure 4:
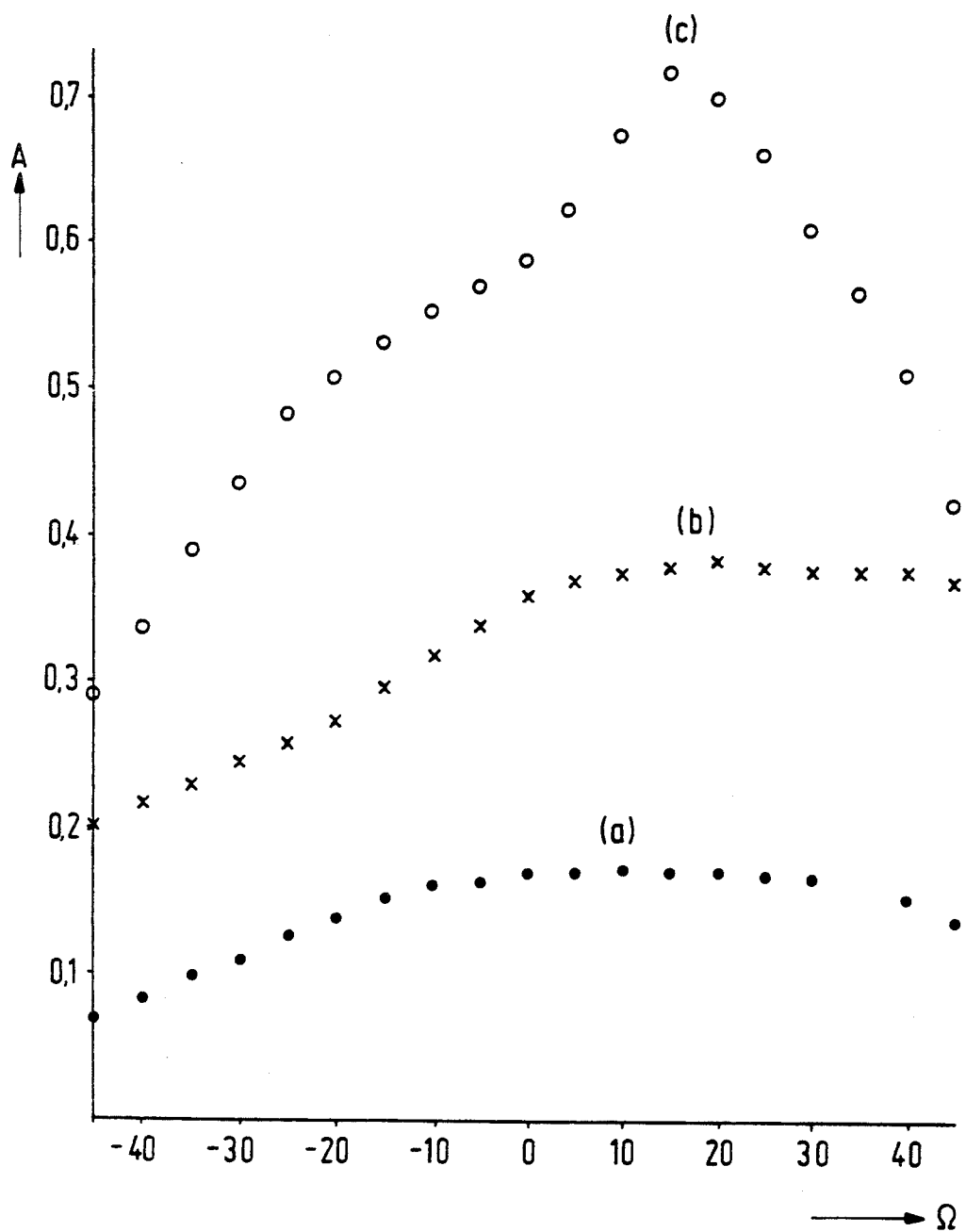
FIG. 4 shows the absorption A as a function of the angle between the perpendicular on the substrate and a light beam with perpendicular polarisation for concentrations of (a) 0.45 wt. %, (b) 0.91 wt. % and (c) 1.82 wt. %, respectively.
Figures 5, 6:
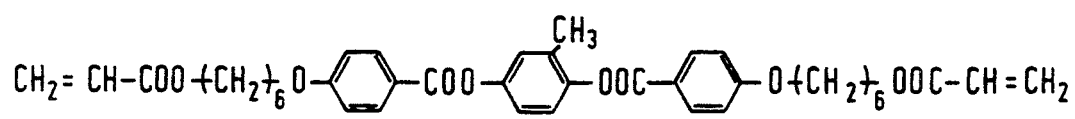
FIG. 5 is the chemical formula for C6M.

In FIG. 4, the absorption A, which has been corrected for the thickness as regards $0=0$, is plotted as a function of the angle $\Omega$ which is defined as the angle between the incident light beam having a perpendicular polarisation and the perpendicular on the substrate. This Figure shows that the absorption decreases with a decreasing concentration of the solution. Further, the curves are asymmetrical and the maximum values in the curves are levelled off and tend towards lower values according as the concentration of the solution decreases. This implies that there is a distribution of angles in the vertical direction, which angles are formed by the molecules with respect to the surface, and the average value of the angle decreases as the layer thickness decreases.

The optical retardations of the anisotropic gel layers were also measured. The absorption band is at 300 nm as a result of the cyano group which is coaxial with the optical axis of the molecules. The layer thickness was calculated using the values of effective birefringence $(\Delta n)_{eff}$ from the following equation in which uniaxially inclined orientation within the system was assumed:

$$(\Delta n)_{eff} = \frac{n_e n_o}{(n_o^2\cos^2\alpha + n_e^2\sin^2\alpha)^{\frac{1}{2}}} \quad (1)$$

where $\alpha$ is the angle between the direction of polarisation of light and the direction of molecular orientation, and $n_e$ and $n_o$ are the extraordinary and ordinary refractive indices of the molecules. To calculate the layer thickness, the value of $\alpha$ was estimated by means of FIG. 4. The layer thickness is larger as the solution concentration is higher.

From the above it follows that the thickness of the surface layer and the average angle of inclination in the layers can be controlled. Cells in accordance with FIG. 1, having anisotropic gel layers of different thicknesses were filled with E70 in the isotropic state. The retardation within the cells as a result of E70 was measured at room temperature and the effective birefringence was calculated by means of the value of the cell distance, i.e. the distance between the anisotropic gel layers of the cell, which is determined by the spacers. Then, the angle of inclination $\theta'$ which was induced in the E70-layer by the anisotropic gel layer, was estimated by means of the values of $n_o$ and $n_e$ for E70 at room temperature using equation (1), and the effective birefringence in the cell was measured. Values of the angle of inclination $\theta'$ for various layers are shown in Table A. Said Table shows that angles of inclination induced by the anisotropic gel layers increase as the anisotropic gel layer thickness increases. The angles of inclination induced by the anisotropic gel layers, however, are much larger than the estimated average angles of inclination within the anisotropic gel layers. This confirms that there is a vertical distribution of angles of inclination within the anisotropic gel layer (see FIG. 2A and B), which, at the interface between the anisotropic gel layer and the E70-layer, is the inclination induced in E70.

In addition to the thickness of the anisotropic gel layer, there are other factors which influence the angle of inclination to be induced in an applied liquid crystalline layer: the material of the substrate or the orientation layer provided thereon, whether this is rubbed or not, the composition of the anisotropic gel layer, the composition of the applied liquid crystal system and the polymerisation temperature.

The influence of the anisotropic gel composition is also given in table A. The Table shows that the use of ZLi from Merck instead of E7 results in a substantially smaller induced angle of inclination. The chemical formula of ZLi is shown in FIG. 7.

Table B gives the effect of the substrate or the orientation layer, which are all rubbed. A 1.7% by weight solution of 10% by weight of C6M and 90% by weight of E7 in THF was used, and E70 was used as the applied liquid crystalline layer. The angles of inclination $\theta'$ were measured by means of the crystal-rotation method.

Table C gives the effect of the polymerisation temperature, of E7 on inclination angle.

iary layer has been discussed, which mixture yields an anisotropic gel after fixation by photopolymerisation, it is possible that a liquid crystalline layer is used for the liquid crystalline auxiliary layer, the angle of inclination of the molecules of which at the interface with the substrate differs maximally from the angle of inclination of its molecules at the interface with a predetermined medium when the liquid crystalline auxiliary layer is sufficiently thick, and the orientation of at least a part of its molecules can be permanently fixed, the predetermined medium does not necessarily have to be a nitrogen gas, alternatively another gaseous medium can be used, while a solid medium is also possible. It is also possible that the maximum difference between the angles of inclination is not approximately 9° as in the case of a homogeneous orientation at one interface and a homeotropic orientation at the other interface. It is noted, perhaps unnecessarily that the maximum difference is to be understood to mean the maximum difference at a given substrate and a given medium between which the liquid crystalline auxiliary layer is provided in a sufficient thickness, a sufficient thickness is to be understood to mean that there are no interaction effects between the interfaces.

Although it may be desirable to provide an orientation layer or rub the substrate to orient the molecules of the liquid-crystalline auxiliary layer, it is possible that a reproducible orientation can be obtained on the basis of a homogeneous orientation at the substrate interface.

We claim:

1. A method of providing a surface layer on a substrate, which surface layer brings about an inclined orientation of the molecules of a predetermined medium in contact with the surface layer, at the interface between the surface layer and the medium, the method comprising applying, as the surface layer, a liquid-crystalline auxiliary layer to the substrate, the angle of inclination of the molecules of said auxiliary layer differing maximally from a minimum at the interface with the substrate to a maximum at the interface with the predetermined medium when the liquid crystalline layer is

TABLE A

| Concentration of the solution in wt. % | Retardation in nm with E7/C6M | Average angle of inclination in degrees with E7/C6M | Effective birefringence value with E7/C6M | Thickness in nm with E7/C6M | 0' degrees, induced in E70 with E7/C6M | ZLi/C6M |
|---|---|---|---|---|---|---|
| 0.23 | 1.1 | 10 | 0.187 | 6.0 | 30 | 9 |
| 0.45 | 3.2 | 10 | 0.187 | 17.2 | 44 | 12 |
| 0.91 | 11.0 | 15 | 0.177 | 62.1 | 56 | — |
| 1.82 | 15.0 | 15 | 0.177 | 84.7 | 72 | — |

TABLE B

| Substrate | Angle of inclination $\theta'$ in degrees |
|---|---|
| Polyimide | 64 |
| Polyethylene | 70 |
| Polyacrylonitril | 64 |
| Glass | 85 |

TABLE C

| Polymerisation temperature in °C. | Inclination angle, $\theta$ in degrees |
|---|---|
| 23 | 64 |
| 40 | 62 |
| 50 | 1 |

Although in the foregoing the use of a mixture of liquid crystalline materials as the liquid crystalline auxilsufficiently thick, and the orientation of at least a part of its molecules capable of being permanently fixed, said liquid crystalline auxiliary layer being applied in such a thickness that, at the interface with the predetermined medium, the molecules of the liquid crystalline auxiliary layer have a desired angle of inclination which lies between the maximum and minimum angles of inclination, after which the orientation of at least a part of the molecules with the desired angle of inclination of the liquid crystalline auxiliary layer is permanently fixed.

2. A method as claimed in claim 1, in which an orientation layer is applied to the substrate before the liquid crystalline auxiliary layer is applied, which orientation layer provides a slightly inclined orientation to the molecules of the auxiliary layer.

3. A method as claimed in claim 1, in which the molecular orientation of the liquid crystalline auxiliary layer at the interface with the substrate is at least substantially homogeneous and at the interface with the predetermined medium at least substantially homeotropic.

4. A method as claimed in claim 1, characterized in that the predetermined medium is a gas or a gas mixture.

5. A method as claimed in claim 4, characterized in that the gas is nitrogen gas.

6. A method as claimed in claim 1, characterized in that the liquid crystalline auxiliary layer is a mixture of liquid crystalline materials, which yields an anisotropic gel after fixation by photopolymerisation.

7. A method as claimed in claim 2, in which the molecular orientation of the liquid crystalline auxiliary layer at the interface with the substrate is at least substantially homogeneous and at the interface with the predetermined medium at least substantially homeotropic.

8. A method as claimed in claim 2, characterized in that the predetermined is a gas or a gas mixture.

9. A method as claimed in claim 3, characterized in that the predetermined medium is a gas or a gas mixture.

10. A method as claimed in claim 2, characterized in that the liquid crystalline auxiliary layer is a mixture of liquid crystalline materials, which yields an anisotropic gel after fixation by photopolymerisation.

11. A method as claimed in claim 3, characterized in that the liquid crystalline auxiliary layer is a mixture of liquid crystalline materials, which yields an anisotropic gel after fixation by photopolymerisation.

12. A method as claimed in claim 4, characterized in that the liquid crystalline auxiliary layer is a mixture of liquid crystalline materials, which yields an anisotropic gel after fixation by photopolymerisation.

13. A method as claimed in claim 5, characterized in that the liquid crystalline auxiliary layer is a mixture of liquid crystalline materials, which yields an anisotropic gel after fixation by photopolymerisation.

* * * * *